United States Patent
Lee et al.

(10) Patent No.: US 10,850,180 B2
(45) Date of Patent: Dec. 1, 2020

(54) SCREEN GOLF SYSTEM, GOLF INFORMATION SERVICE METHOD AND MOBILE TERMINAL CONTROL METHOD FOR GOLF INFORMATION SERVICE REALIZED IN SCREEN GOLF SYSTEM, AND COMPUTING-DEVICE-READABLE RECORDING MEDIUM HAVING PROGRAM FOR PERFORMING THE METHODS RECORDED THEREIN

(71) Applicant: GOLFZON CO., LTD., Daejeon (KR)

(72) Inventors: Ji Ung Lee, Seongnam-si (KR); Chang Sun Yang, Seoul (KR); Hee Su Lee, Seoul (KR); Chang Jin Hong, Namyangju-si (KR)

(73) Assignee: GOLFZON CO., LTD., Daejeon (KR)

( * ) Notice: Subject to any disclaimer, the term of this patent is extended or adjusted under 35 U.S.C. 154(b) by 0 days.

(21) Appl. No.: 16/085,591

(22) PCT Filed: Mar. 14, 2017

(86) PCT No.: PCT/KR2017/002751
§ 371 (c)(1),
(2) Date: Sep. 17, 2018

(87) PCT Pub. No.: WO2017/160061
PCT Pub. Date: Sep. 21, 2017

(65) Prior Publication Data
US 2019/0022509 A1    Jan. 24, 2019

(30) Foreign Application Priority Data

Mar. 17, 2016 (KR) .................. 10-2016-0032400

(51) Int. Cl.
*A63B 71/06* (2006.01)
*A63B 24/00* (2006.01)
(Continued)

(52) U.S. Cl.
CPC .......... *A63B 71/0622* (2013.01); *A63B 24/00* (2013.01); *A63B 69/36* (2013.01);
(Continued)

(58) Field of Classification Search
CPC . A63B 71/0622; A63B 71/04; A63B 69/3658; A63B 2071/0636; A63B 2071/0638
See application file for complete search history.

(56) References Cited

U.S. PATENT DOCUMENTS

| | | | | |
|---|---|---|---|---|
| 4,150,825 A | * | 4/1979 | Wilson | A63B 24/0021 473/152 |
| 2011/0028196 A1 | * | 2/2011 | Choi | A63B 24/0021 463/3 |

(Continued)

FOREIGN PATENT DOCUMENTS

| | | |
|---|---|---|
| KR | 10-0923066 B1 | 10/2009 |
| KR | 10-0927656 B1 | 11/2009 |

(Continued)

OTHER PUBLICATIONS

International Search Report for PCT/KR2017/002751 dated Jul. 10, 2017 from Korean Intellectual Property Office.

*Primary Examiner* — Werner G Garner
(74) *Attorney, Agent, or Firm* — Revolution IP, PLLC

(57) ABSTRACT

A golf information service method realized in a screen golf system, the golf information service method, includes: a mobile terminal of each of a plurality of users accessing a server connected to a simulator, configured to realize an image in which a virtual ball is simulated on a virtual golf course such that the users play a virtual golf game, over a network; the server receiving information about the golf game that is being performed by the simulator from the simulator; the server transmitting the information about the golf game, received from the simulator, and information about a course map based thereon to the mobile terminal;

(Continued)

and the mobile terminal displaying information about progress of the golf game on the course map of a hole on which the golf game is being played based on the information about the golf game.

12 Claims, 7 Drawing Sheets

(51) Int. Cl.
    *G06Q 50/10*     (2012.01)
    *A63B 69/36*     (2006.01)
    *G06Q 10/06*     (2012.01)
    *A63B 71/04*     (2006.01)

(52) U.S. Cl.
    CPC .......... *A63B 69/3658* (2013.01); *A63B 71/04* (2013.01); *A63B 71/06* (2013.01); *G06Q 10/06* (2013.01); *G06Q 10/0639* (2013.01); *G06Q 50/10* (2013.01); *A63B 2071/0636* (2013.01); *A63B 2071/0638* (2013.01)

(56) References Cited

U.S. PATENT DOCUMENTS

| 2011/0230986 A1* | 9/2011 | Lafortune ........... G06F 19/3481 700/93 |
| 2011/0294586 A1 | 12/2011 | Cho et al. |
| 2011/0301927 A1 | 12/2011 | Ok |

FOREIGN PATENT DOCUMENTS

| KR | 10-2011-0032484 A | 3/2011 | |
| KR | 10-2011-0103133 A | 9/2011 | |
| KR | 10-1277087 B1 | 6/2013 | |
| KR | 10-1313269 B1 | 9/2013 | |
| KR | 10-2015-0049909 A | 5/2015 | |
| KR | 10-1555840 B1 | 9/2015 | |
| WO | WO-2016010476 A2 * | 1/2016 | ............. A63B 69/36 |

* cited by examiner

SCREEN GOLF SYSTEM, GOLF INFORMATION SERVICE METHOD AND MOBILE TERMINAL CONTROL METHOD FOR GOLF INFORMATION SERVICE REALIZED IN SCREEN GOLF SYSTEM, AND COMPUTING-DEVICE-READABLE RECORDING MEDIUM HAVING PROGRAM FOR PERFORMING THE METHODS RECORDED THEREIN

TECHNICAL FIELD

The present invention relates to a screen golf system and a golf information service method and a mobile terminal control method for golf information service realized in the screen golf system that are capable of imaging and simulating a virtual golf course and of simulating the trajectory of a golf ball directly hit by a user on the virtual golf course such that a plurality of users enjoys a virtual golf game.

BACKGROUND ART

With the recent upsurge in the number of golfers, a so-called screen golf system, which enables a golfer to practice golf and to play a round of virtual golf using a virtual golf simulation system, has gained popularity.

The screen golf system senses the velocity and direction of a golf ball that a golfer hits onto a screen installed indoors to display a virtual golf course and displays the progress of the golf ball on the screen. The screen golf system enables a user to feel the same realism that the user feels when playing a round of golf on an actual golf course, which exceeds the level of enjoyment of a golf game that is simply played indoors. For this reason, the number of users who enjoy screen golf has considerably increased, in addition to users who play rounds of golf on actual golf courses.

In the screen golf system, which is realized by a virtual golf simulation apparatus, it is necessary to provide the same sense of realism that a user feels when the user plays a round of golf on an actual golf course and to provide various kinds of content that cannot be provided by the actual golf course or a golf driving range due to the characteristics of the screen golf system, which is served through various kinds of high-technology apparatuses and systems, in order to excite golfers' interest.

RELEVANT PRIOR ART DOCUMENTS

1. Korean Patent Application No. 10-2012-0086330
2. Korean Patent Application No. 10-2010-0022314
3. Korean Patent Application No. 10-2009-0089995

DISCLOSURE

Technical Problem

It is an object of the present invention to provide a screen golf system and a golf information service method and a mobile terminal control method for golf information service realized in the screen golf system that are configured such that, when a plurality of users plays a golf game in the screen golf system, which is configured such that an image of a virtual golf course is realized and the trajectory of a ball moved as the result of a golf shot is simulated on the virtual golf course, each of the users accesses the system using his/her mobile terminal in order to obtain information about the golf game that is being played, and confirms his/her own hole play method through manipulation of the mobile terminal in order to more strategically play the golf game and such that the information set by the user through the mobile terminal is reflected in the golf game in such a manner that the information is automatically reflected in the golf game according to the selection of the user without a simulator setting the hole play method confirmed by the user through the mobile terminal again, which is troublesome, thereby improving the convenience of the user who enjoys the golf game through the screen golf system.

Technical Solution

In accordance with an aspect of the present invention, the above and other objects can be accomplished by the provision of a golf information service method realized in a screen golf system, the golf information service method including a mobile terminal of each of a plurality of users accessing a server connected to a simulator, configured to realize an image in which a virtual ball is simulated on a virtual golf course such that the users play a virtual golf game, over a network, the server receiving information about the golf game that is being performed by the simulator from the simulator, the server transmitting the information about the golf game, received from the simulator, and information about a course map based thereon to the mobile terminal, and the mobile terminal displaying information about progress of the golf game on the course map of a hole on which the golf game is being played based on the information about the golf game.

The golf information service method may further include setting a next target from the current position of a ball on the displayed course map according to manipulation of the mobile terminal by the user, the server receiving information about the user of the mobile terminal and information about the position of the set next target from the mobile terminal and transmitting the received information to the simulator, and when the user of the mobile terminal becomes the next player who takes a golf shot, the simulator setting the direction and the distance of a shot that is taken by the user from the current position of the ball to the received position of the next target and displaying the set direction and distance of the shot on an image.

The golf information service method may further include setting a golf club to be used to take a next golf shot from the current position of a ball on the displayed course map according to manipulation of the mobile terminal by the user, the server receiving information about the user of the mobile terminal and information about the set golf club to be used to take the next golf shot from the mobile terminal and transmitting the received information to the simulator, and when the user of the mobile terminal becomes the next player who takes a golf shot, the simulator setting a golf club to be used by the user based on the received information about the set golf club so as to be reflected in the progress of the golf game.

In accordance with another aspect of the present invention, there is provided a computing-device-readable recording medium having a program for performing the golf information service method recorded therein.

In accordance with another aspect of the present invention, there is provided a mobile terminal control method for golf information service realized in a screen golf system, the mobile terminal control method including accessing a server connected to a simulator, configured to realize an image in which a virtual ball is simulated on a virtual golf course such that a plurality of users plays a virtual golf game, over a network, receiving information about the golf game that is being performed by the simulator and information about a course map based thereon from the server, and displaying the course map received from the server and displaying information about progress of the golf game on the displayed course map.

In accordance with a further aspect of the present invention, there is provided a screen golf system for realizing an image in which a virtual ball is simulated on a virtual golf course such that a plurality of users plays a virtual golf game, the screen golf system including a sensing device for generating sensing information of a golf ball hit by each of the users, a data storage for storing data necessary to perform the virtual golf game, an image-processor for realizing an image simulating the virtual golf course and the virtual ball using the data stored in the data storage, and a controller for performing a calculation for simulation of the virtual ball corresponding to the hit golf ball based on the sensing information sensed by the sensing device, transmitting information about the golf game to a server, which is connected to the controller via a network, and receiving, from a mobile terminal of a user accessing the server, information set by the user of the mobile terminal through the server so as to be reflected in displaying information for guiding the progress of the golf game.

Advantageous Effects

A screen golf system and a golf information service method and a mobile terminal control method for golf information service realized in the screen golf system according to the present invention have effects in that, when a plurality of users plays a golf game in the screen golf system, which is configured such that an image of a virtual golf course is realized and such that the trajectory of a ball moved as the result of a golf shot is simulated on the virtual golf course, each of the users accesses the system using his/her mobile terminal in order to obtain information about the golf game that is being played, and confirms his/her own hole play method through manipulation of the mobile terminal in order to more strategically play the golf game and in that the information set by the user through the mobile terminal is reflected in the golf game in such a manner that the information is automatically reflected in the golf game according to the selection of the user without a simulator setting the hole play method confirmed by the user through the mobile terminal again, which is troublesome, thereby improving the convenience of the user who enjoys the golf game through the screen golf system.

BEST MODE

A screen golf system and a golf information service method and a mobile terminal control method for golf information service realized in the screen golf system according to the present invention will be described in more detail with reference to the accompanying drawings.

First, the construction of a screen golf system according to an embodiment of the present invention will be described with reference to FIGS. 1 and 2.

Figure 1:
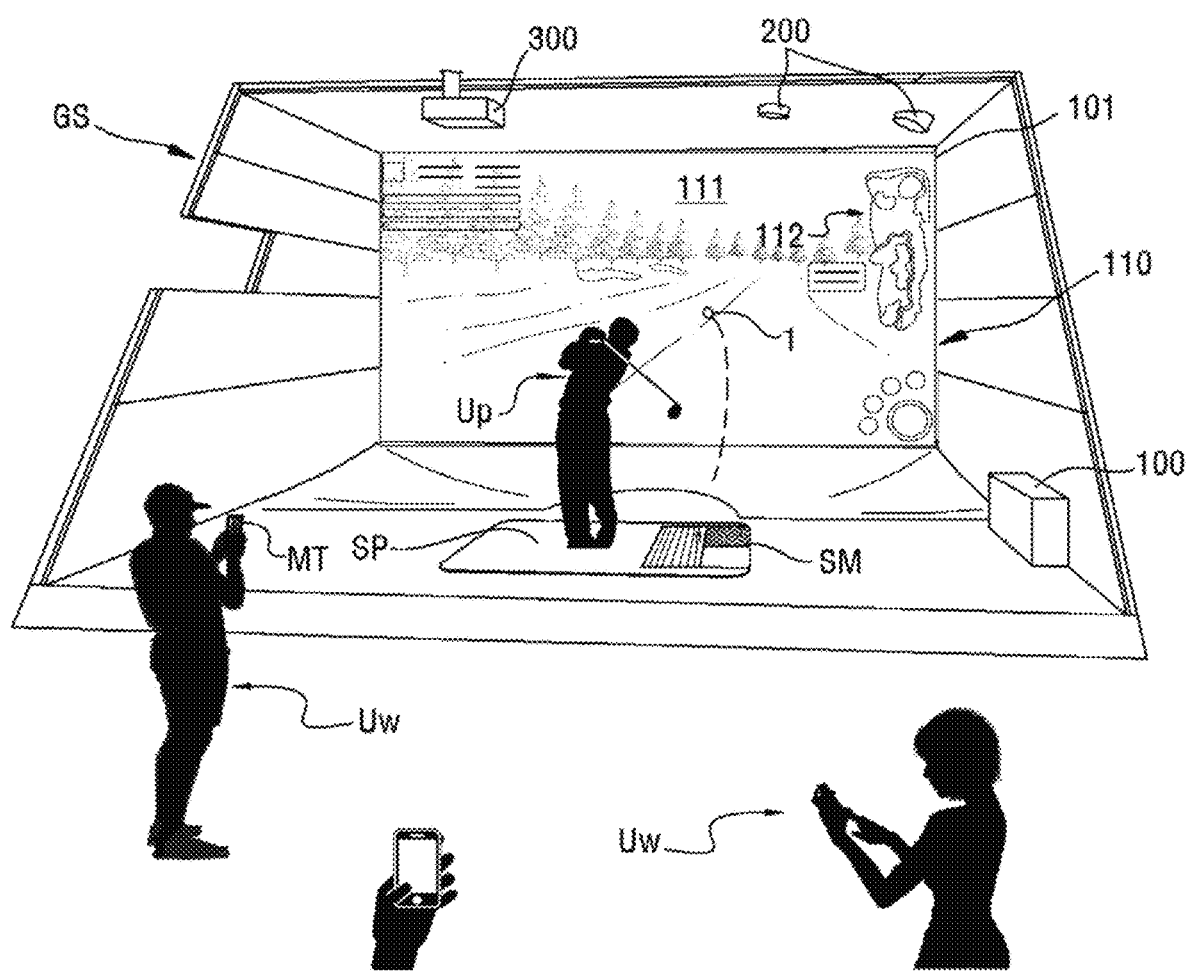
FIG. 1 is a view showing a screen golf system according to an embodiment of the present invention.
Figure 2:
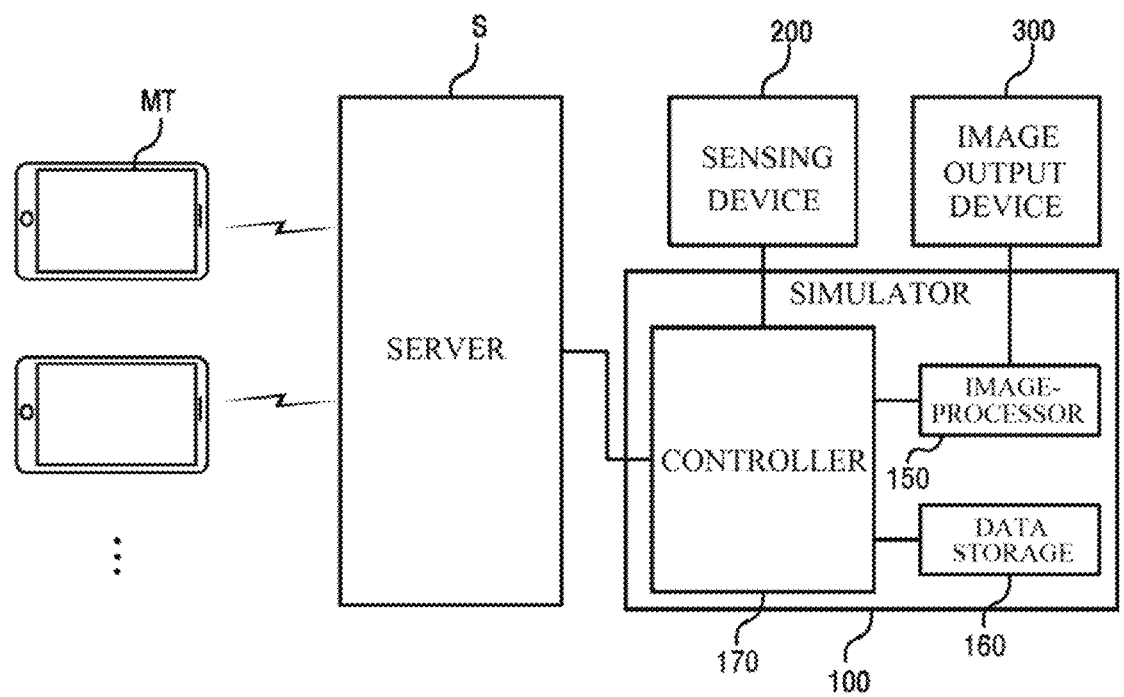
FIG. 2 is a block diagram showing the construction of the screen golf system according to the embodiment of the present invention.

FIG. 1 is a view showing a screen golf system according to an embodiment of the present invention, and FIG. 2 is a block diagram showing the construction of the screen golf system according to the embodiment of the present invention.

As shown in FIGS. 1 and 2, the screen golf system according to the embodiment of the present invention may include a virtual golf simulation apparatus, which includes a simulator 100, a sensing device 200, and an image output device 300, a server S connected to the simulator 100 over a network, and a user mobile terminal MT connectable to the server S so as to perform wireless communication.

The virtual golf simulation apparatus of the screen golf system according to the embodiment of the present invention may be configured such that an image processed by the simulator is output to a front screen through the image output device, as in a general screen golf system. According to the present invention, as shown in FIG. 1, the virtual golf simulation apparatus may be configured such that a shot plate SP, on which a user Up takes a golf swing, and a screen 101, which is installed in front of a shot mat SM, on which a golf ball to be hit by the user Up using a golf club is placed, are provided in a golf play space GS having a predetermined size and such that the image output device 300 outputs an image processed by the simulator 100 to the screen 101 in order to realize a virtual environment, whereby it is possible for a plurality of users Up and Uw (Up indicating a user who is playing and Uw indicating users who are waiting) to play virtual golf.

The image output device 300 is configured to project an image processed by the simulator 100 (various images for screen golf, such as an image of a virtual golf course and an image simulating a virtual ball) onto the screen 101.

Hereinafter, the image that is output to the screen 101 will be referred to as a screen image 110.

Meanwhile, as shown in FIG. 2, the simulator 100 includes an image-processor 150, a data storage 160, and a controller 170. Basically, the image-processing device generates an image of a virtual golf course, on which the user plays golf, and outputs the generated image to the respective screens. In addition, the image-processing device generates a simulation image, in which a virtual ball moves, based on information about the motion of a golf ball 1 sensed and calculated by the sensing device 200 when the user hits the golf ball on the shot plate SP, and outputs the generated simulation image to the screen 101.

The data storage 160 may be configured to store various kinds of information about the operation of the virtual golf simulation apparatus of the screen golf system according to the embodiment of the present invention and to store image data necessary to realize a virtual golf course image.

Alternatively, data necessary to realize a virtual golf course image may be stored in a database of the server S, a piece of the data necessary to realize the virtual golf course image selected by the user may be extracted from the database of the server S and may then be transmitted to the simulator 100, and the transmitted data may be temporarily stored in the data storage 160.

The image-processor 150 is configured to process all images related to a golf game played using screen golf, such as an image of a virtual golf course, an image of the motion of a virtual ball, and an image for menu selection, as data received from the data storage 150 or from the server S.

The controller 170 is configured to perform various calculations for virtual golf simulation and control of the respective elements.

In particular, when a golf game on a virtual golf course is played by the users, the controller 170 is configured to transmit information about the golf game that is being played to the server S in real time, at predetermined time intervals, or in a predetermined specific situation.

Meanwhile, the sensing device 200 is a device that senses the motion of at least one of a golf club or a golf ball when the user takes a golf swing.

The sensing device 200 may be realized in any of various forms. The sensing device may be an infrared-sensor-type sensing device, which emits infrared rays, receives the infrared rays reflected by a golf club head or a ball that is moved when the user hits the ball, and analyzes the reflected infrared rays in order to sense the motion of the golf club head or the ball, a laser-sensor-type sensing device, which emits laser beams and then senses and analyzes the laser beams blocked by a golf club head or a ball that is moved in order to sense the motion of the golf club head or the ball, or an image-sensor-type sensing device, which collects and analyzes images of a ball hit as the result of the user taking a golf swing using a golf club in order to sense the motion of the ball.

In the case in which the sensing device 200 is an image-sensor-type sensing device, it is possible to sense a greater number of objects than when using other types of sensing devices. For example, the sensing device may acquire an image of the shot plate in order to sense the position on the shot mat SM on which a golf ball is placed, and may sense the motion of the golf ball placed on the shot mat in order to sense whether the user is ready to hit the golf ball. Furthermore, the sensing device may also sense the motion of the user in order to obtain information about whether the user is ready to hit the golf ball based on information about whether the user stands on the shot plate or whether the user remains stationary for a predetermined amount of time.

Of course, it is possible to sense the motion of the user using the separate sensor, for example, a depth camera device.

Meanwhile, all devices that are mobile and accessible to the server S over the Internet, such as a smartphone, a tablet PC, and a personal digital assistant (PDA), may be used as the user mobile terminal MT.

FIG. 2 shows the screen golf system according to the embodiment of the present invention, which is configured such that the user mobile terminal MT is accessible to the server S over the Internet so as to communicate with the server S, such that the simulator 100, the server S, and the mobile terminal MT are connected to each other to constitute a single network system, and such that the mobile terminal MT transmits and receives information to and from the simulator via the server S. However, the present invention is not limited thereto. The screen golf system according to the present invention may be configured such that the mobile terminal MT is directly accessible to the simulator 100 using near field wireless communication (for example, Bluetooth communication), rather than via the server S, so as to communicate with the simulator 100.

The simulator 100 of the screen golf system according to the embodiment of the present invention is configured such that, when a golf game is played on a virtual golf course by a plurality of users, the simulator 100 transmits information about the golf game that is being played to the server S in real time, at predetermined time intervals, or in a predetermined specific situation.

The server S extracts relevant data based on the information received from the controller 170 of the simulator, and transmits the extracted data to the user mobile terminal MT such that users, i.e. users Uw who are waiting, can establish a strategy for their golf shot based on information about the progress of the current golf game.

As shown in FIG. 1, a main image 111 of a virtual golf course, which is a virtual space in which a golf game is played, is realized on the screen image 110, and a mini map 112, showing information about the map of a hole on which the game is being played and various kinds of information about the progress of the current golf game, such as information about the current position of each of the balls owned by a plurality of users on the hole and distance information, topography information, and weather information (e.g. information about the direction and speed of the wind) based on the current position of the ball, is displayed at one side of the screen image 110.

The user Up who is playing may plan an appropriate strategy for playing the game from the current position of the ball on the hole on which the game is being played through the mini map 112.

However, it is possible for the users other than the user Up who is playing, i.e. the users Uw who are waiting, to plan a strategy for the current hole only when they enter the shot plate SP in due order. The method according to the present invention is more preferable in terms of user convenience and strategic progress of the golf game.

That is, according to the present invention, it is possible for users other than the user Up who is playing, i.e. the users Uw who are waiting, to confirm information about the golf game that is being played and to plan a strategy for the hole on the current position of their ball using their mobile terminal.

Figure 3:
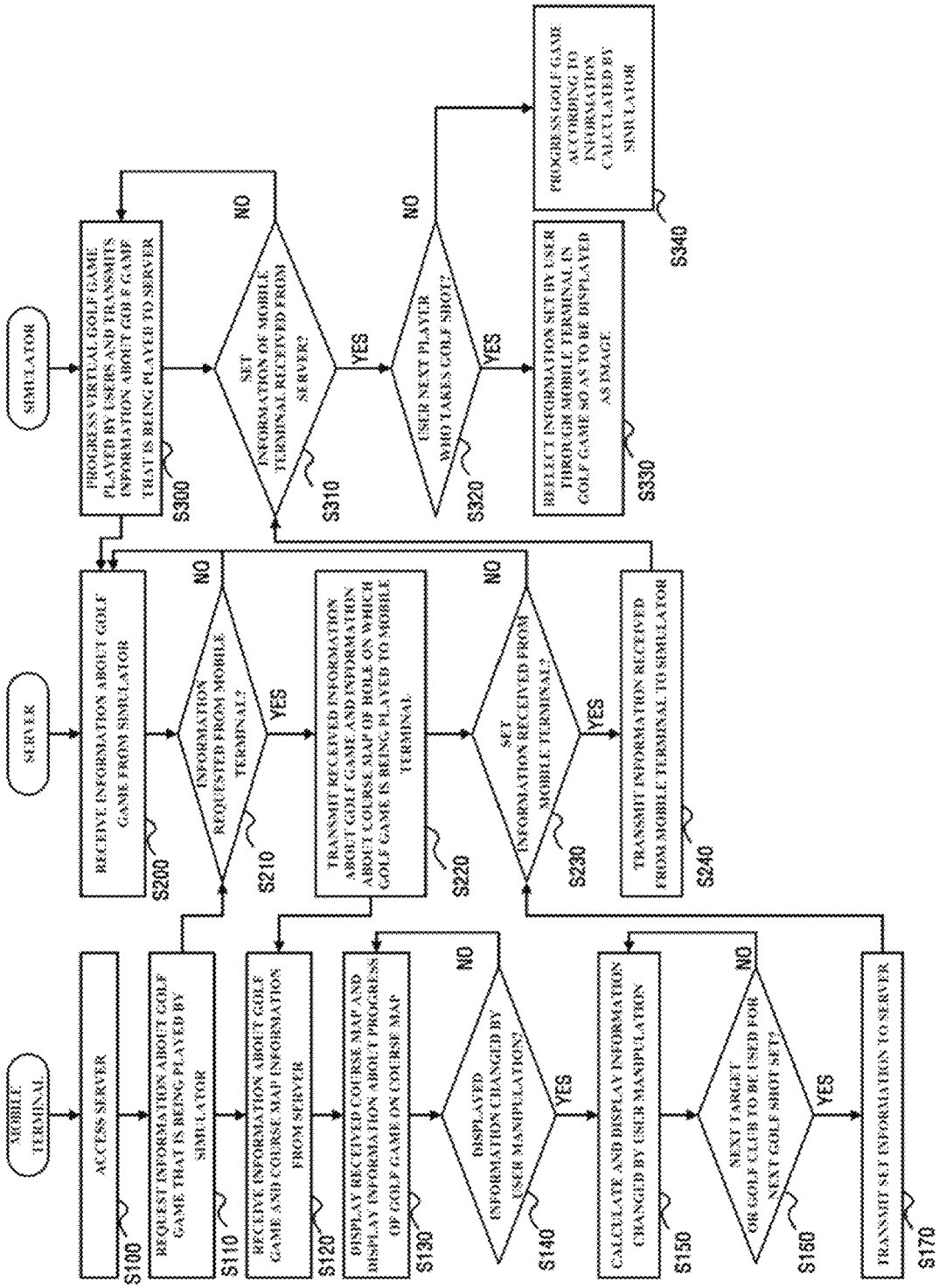
FIG. 3 is a flowchart showing a golf information service method or a mobile terminal control method for golf information service realized in the screen golf system according to the embodiment of the present invention.

A concrete method thereof will be described with reference to FIG. 3, which is a flowchart showing a golf information service method or a mobile terminal control method for golf information service realized in the screen golf system according to the embodiment of the present invention.

A virtual golf game using the simulator is played by a plurality of users (S300), and all or some of the users access the server using their mobile terminal (S100).

When the mobile terminal accesses the server, the mobile terminal requests information about the golf game that is being played by the simulator from the server (S110).

Meanwhile, while the virtual golf game is played by the users, the simulator transmits information about the golf game that is being played to the server S in real time, at predetermined time intervals, or in a predetermined specific situation, e.g. when a golf shot taken by one of the users is simulated (S300).

The server receives information again from the simulator at predetermined time intervals or in a predetermined specific situation, e.g. when a golf shot taken by one of the users is simulated, and updates the information about the golf game.

Here, the information about the golf game that the server receives from the simulator includes game progress information, such as information about the hole currently being played by the users, information about the position of each of the balls owned by the users, information about the position of a target from the position of each ball, calculated by the simulator according to predetermined particulars, information about the shot order based on the play state of the users, weather information (e.g. information about the direction and speed of the wind) for the hole, information about the green of the hole (e.g. information about the topography of the green), and information about the score of the game that is being played.

Also, in the case in which a predetermined specific situation occurs while the virtual golf game is being played by the simulator, additional information may be provided for the specific situation. For example, in the case in which the position of a ball on a par 4 hole is a tee box, information about the average flight distance, the ranking, and the fairway landing rate of the user or other users may be provided. In the case in which the position of a ball on a par 3 hole is a tee box, information about the near pin records, the ranking, and the green landing rate of the user or other users may be provided. In the case in which an approach shot is taken, information about the par save rate record, ranking, and the green landing rate of the user or other users, may be provided. In the case in which the ball lands on the green, additional information about the average number of putts and the putting success rate for each distance may be provided.

On the assumption that the information in the predetermined specific situation is "golf information for each situation", the information about the golf game transmitted from the simulator to the server may also include the "golf information for each situation".

Upon receiving the information about the golf game from the simulator (S200), the server determines whether the information about the golf game that is being played has been requested from the mobile terminal (S210). Upon determining that the information about the golf game has been requested from the mobile terminal, the server extracts information about the course map of the hole on which the golf game is being played from the database and transmits the extracted information to the mobile terminal together with the received information about the golf game (S220).

The mobile terminal receives the information about the golf game and the course map information from the server (S120) and displays the received course map and information about the progress of the golf game (i.e. the position of the ball owned by each user, the position of a target from the position of the ball, the shot order, weather information, green information, and score information), which is displayed on the course map (S130).

The users, i.e. the users who are waiting, may plan a strategy for their golf shot while watching the course map and the information about the progress of the golf game displayed on their mobile terminals.

At this time, the mobile terminal may display the information about the progress of the golf game on the course map based mainly on information about a user stored in the mobile terminal (hereinafter, referred to as a "mobile terminal user").

For example, the mobile terminal may display the position of the ball owned by each user, among the information about the golf game received from the server, on the course map, and may display information about the guidance of the next golf shot. Specifically, the mobile terminal may display, an aiming point, which is the next target, from the current position of the ball owned by the mobile terminal user, and may display a guide line from the position of the ball to the aiming point and topography information and distance information of the aiming point.

In the case in which the mobile terminal of each of the users receives the golf information from the server and displays the received golf information, the mobile terminal may display information about the guidance of the next golf shot at the position of the ball owned by each user, whereby it is possible to provide the golf information based mainly on the information about each user.

Furthermore, the mobile terminal user may display his/her desired strategy on the course map displayed on the mobile terminal through manipulation (in the case in which a mobile terminal, such as a smartphone or a tablet PC, includes a touchscreen, a touch gesture may be made on the course map for manipulation).

The mobile terminal determines whether the displayed information has been changed by the user manipulation (S140). Upon determining that the displayed information has been changed, the mobile terminal calculates the information changed by the user manipulation based on the information received from the server and displays the calculated information (S150).

That is, the mobile terminal calculates the information changed by the user manipulation with respect to a strategy for the next target from the current position of the ball owned by the mobile terminal user, based on the information received from the server, and displays the calculated information on the course map displayed on the mobile terminal.

For example, in the state in which information about a guide line, distance, and height from the current position of the ball owned by the mobile terminal user to an aiming point calculated as the next target by the simulator according to predetermined particulars is displayed on the course map displayed on the mobile terminal, as the user changes the position of the next target to another position toward which the user wishes to take a shot, the distance from the current position of the ball to the changed position of the next target may be calculated, a guide line from the current position of the ball to the changed position of the next target may be displayed, and the calculated distance may be displayed, whereby it is possible to provide the user with information about the guidance of a golf shot to the next target toward which the user wishes to take the golf shot.

Also, in the case in which the mobile terminal user changes the golf club to be used for his/her next golf shot and uses the new golf club at the current position of the ball on the course map, the user may check which strategy is possible.

Furthermore, the mobile terminal may change and set the next target or the golf club to be used for the next golf shot (S160).

In the case in which the next target or the golf club to be used for the next golf shot is set, the mobile terminal transmits the set information to the server (S170). The server receives the set information from the mobile terminal (S230) and transmits the received information to the simulator (S240).

The simulator receives the set information of the mobile terminal from the server (S310) and may reflect the received information in the golf game that is being played. When the user of the mobile terminal (the mobile terminal that transmits the set information) becomes the next player who takes a golf shot while the golf game is being played (S320), the information set by the user through the mobile terminal may be reflected in the golf game so as to be displayed as an image (S330).

That is, when the user set the position of the next target from the current position of the ball to his/her desired position through the mobile terminal, when it is the user's turn to take a golf shot while the golf game is being played by the simulator, the main image and the mini map image in the screen image are displayed in the state in which the set information is reflected in the main image and the mini map image such that the golf shot is taken from the current position of the ball toward the set next target.

In the case in which any of the other users does not make the settings as described above, the user plays the golf game according to information calculated by the simulator (S340).

Hereinafter, examples of golf information that is provided by the mobile terminal operatively connected to the simulator through the server, the change of the information through manipulation, and the reflection of the changed information in the golf game by the simulator in the case in which the changed information is set will be described with reference to FIGS. 4 to 7.

Figure 4:
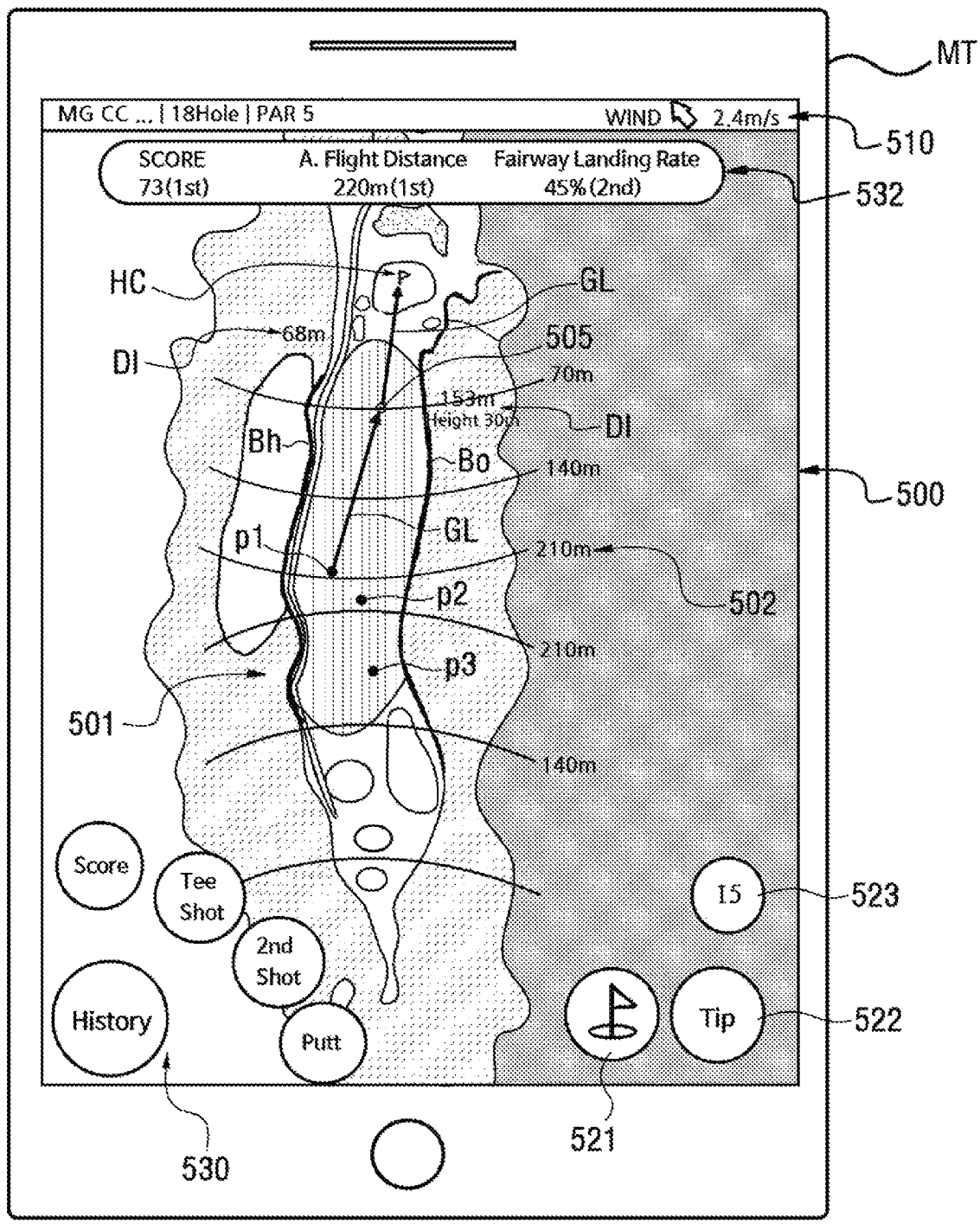
FIG. 4 is a view showing an example of an interface for golf information that is provided by a mobile terminal according to the golf information service method or the mobile terminal control method for golf information service realized in the screen golf system according to the embodiment of the present invention.
Figure 5:
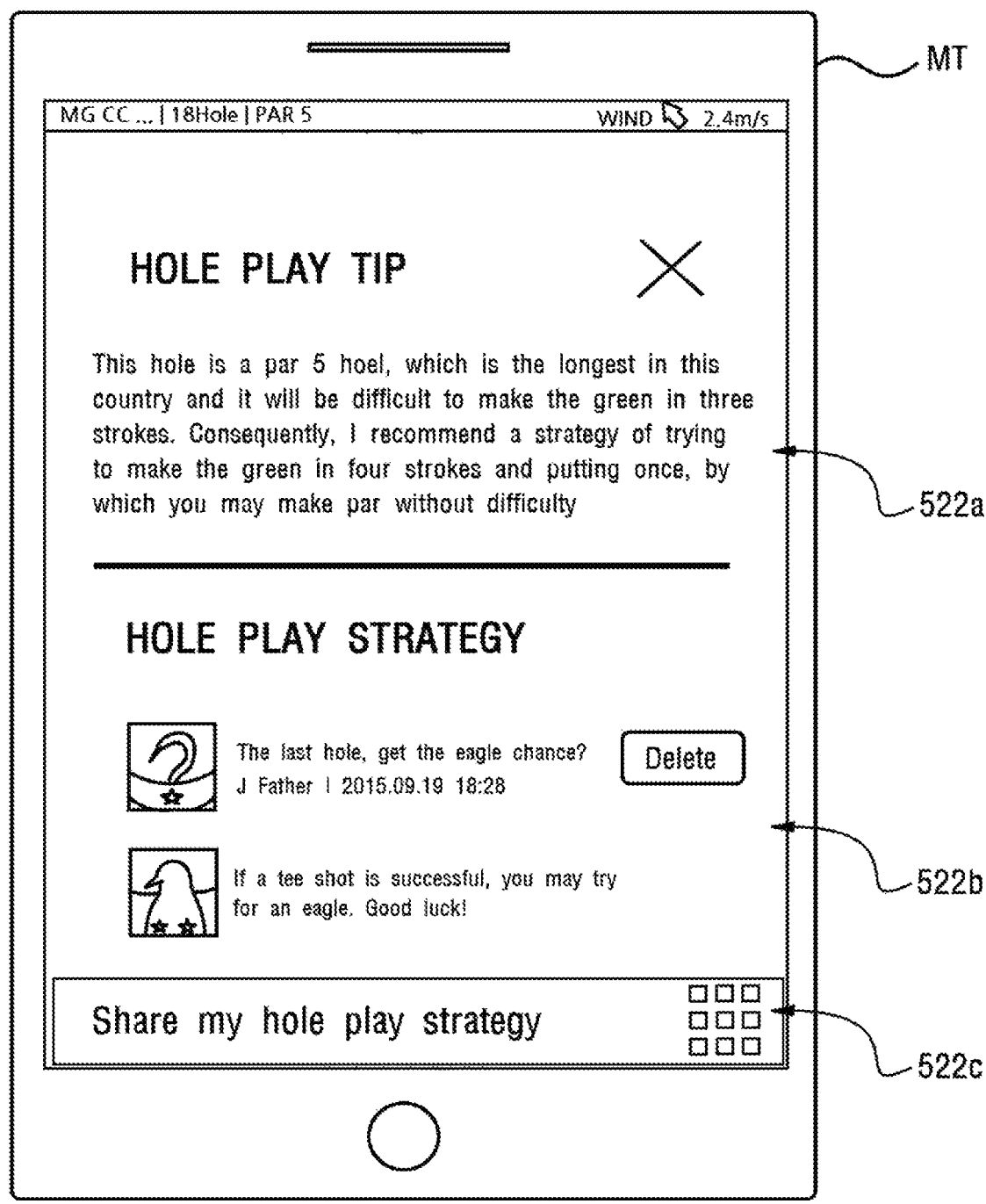
FIG. 5 is a view showing the case in which information about a hole play tip is provided through the interface displayed on the mobile terminal shown in FIG. 4.
Figure 6:
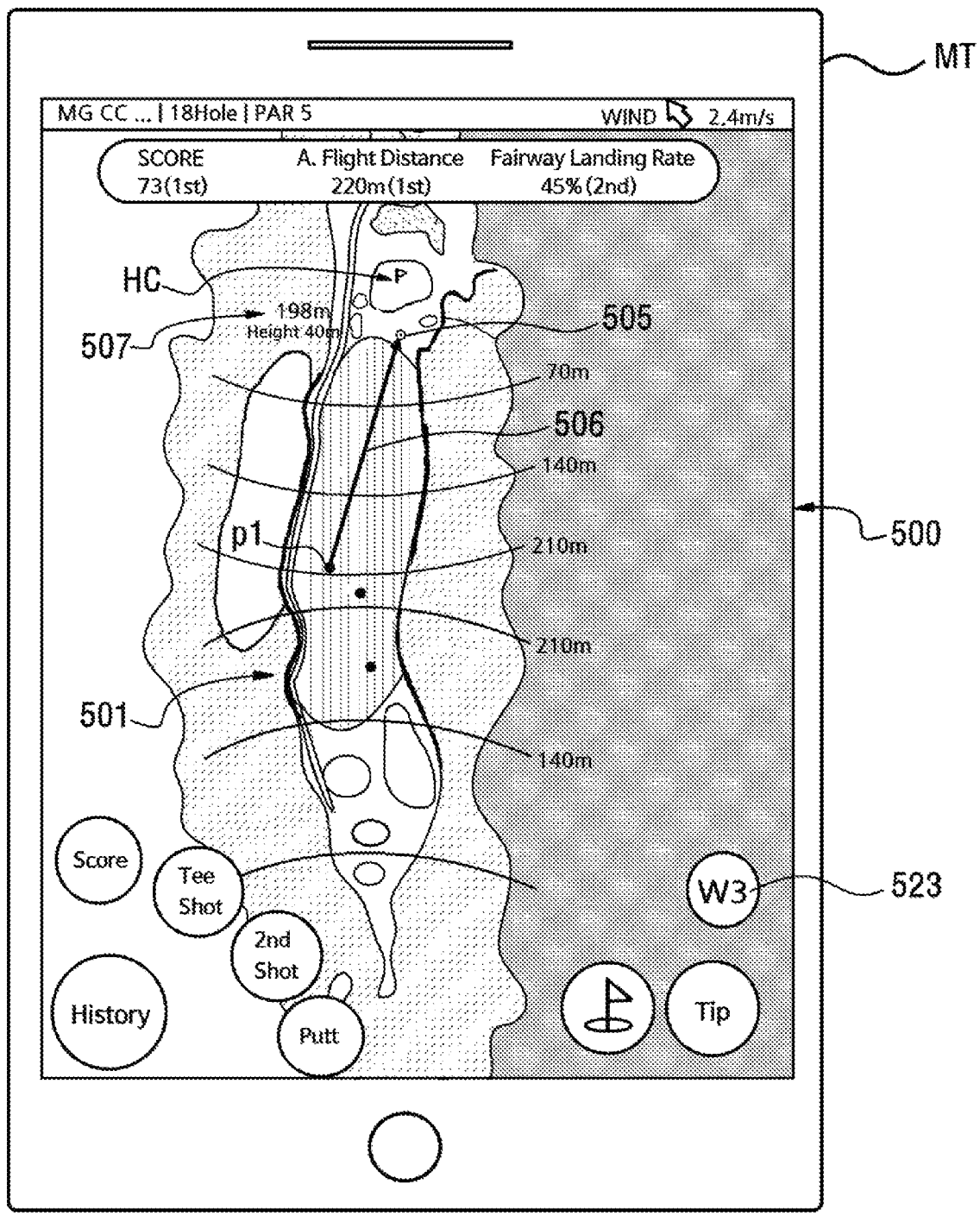
FIG. 6 is a view showing the state in which information changed by manipulation is displayed in order for a user to confirm a strategy for his/her next golf shot through the interface displayed on the mobile terminal shown in FIG. 4.
Figure 7:
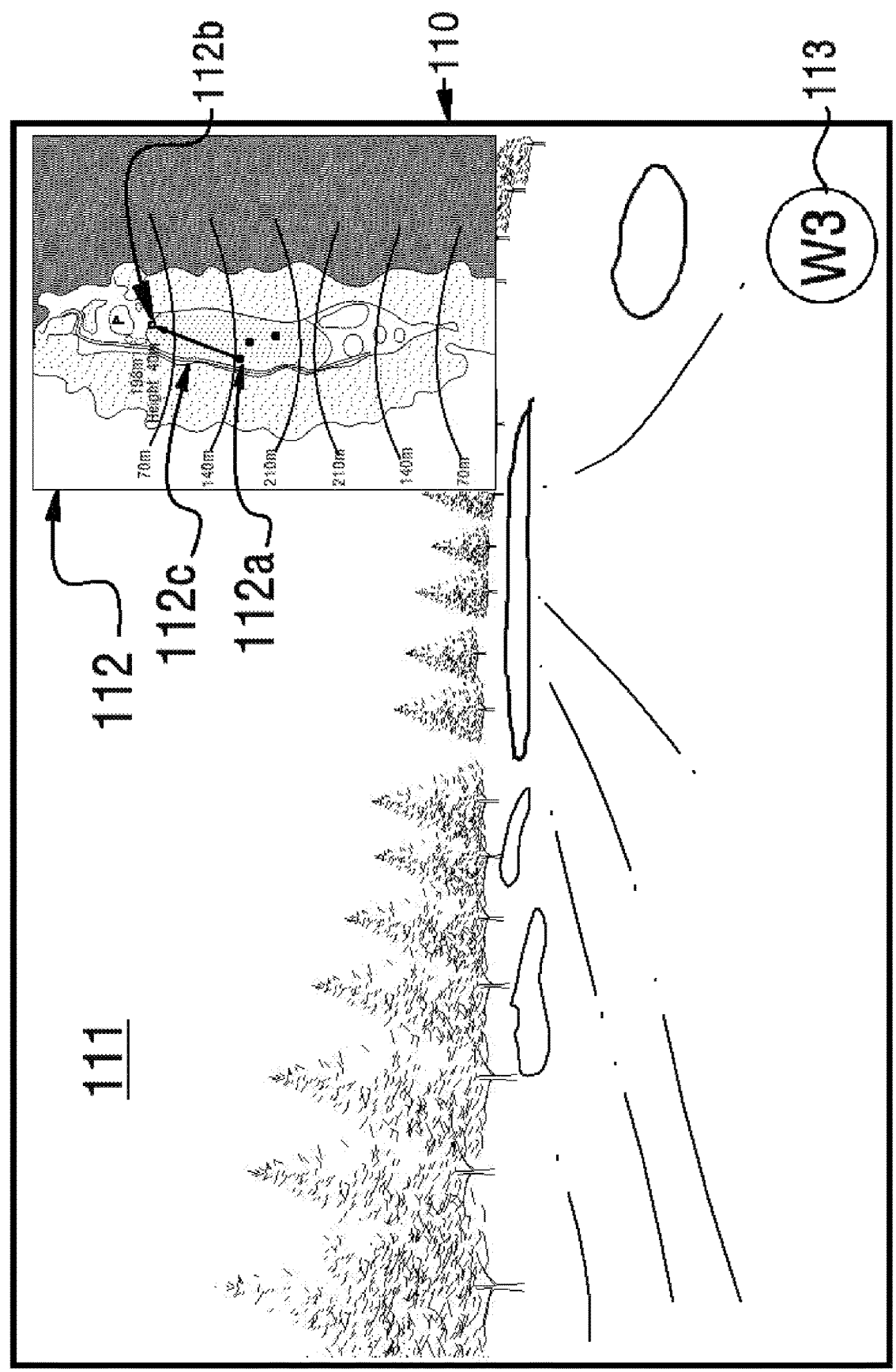
FIG. 7 is a view showing an example of an image in which, in the case in which information displayed on the mobile terminal shown in FIG. 6 is set, the set information is reflected in a golf game performed by a simulator and is then displayed.

FIG. 4 is a view showing an example of an interface for golf information that is provided by the mobile terminal according to the golf information service method or the mobile terminal control method for golf information service realized in the screen golf system according to the embodiment of the present invention, FIG. 5 is a view showing the case in which information about a hole play tip is provided through the interface displayed on the mobile terminal shown in FIG. 4, FIG. 6 is a view showing the state in which information changed by manipulation is displayed in order for the user to confirm a strategy for his/her next golf shot through the interface displayed on the mobile terminal shown in FIG. 4, and FIG. 7 is a view showing an example of an image in which, in the case in which information displayed on the mobile terminal shown in FIG. 6 is set, the set information is reflected in a golf game performed by a simulator and is then displayed.

Referring first to FIG. 4, an interface 500 for providing golf information is displayed on a screen of the mobile terminal MT.

A course map 501 of a hole on which a golf game is being played, received from the server, may be displayed on the interface 500. In addition, course information and weather information of the course map 501 may also be displayed on the interface 500.

A rough boundary line Bo indicating an out-of-bounds zone or a hazard line Bh indicating a hazard may be displayed on the course map 501, as shown in FIG. 4. Of course, in the case in which there is no rough around a hole and no hazard therein, the rough boundary line or the hazard line may not be displayed, and only a line indicating the boundary of the hole may be displayed.

In addition, distance guidance information 502 of an overall section from a tee box to a hole cup HC on the hole may be displayed on the course map 501.

In addition, the current positions p1, p2, and p3 of the balls owned by respective users playing in the current golf game may be displayed on the course map 501. Among the positions p1, p2, and p3 of the balls owned by the respective users, an aiming point 505, which is the next target, from the current position p1 of the ball owned by the user of the mobile terminal on which the course map is being displayed, a guide line GL from the position p1 of the ball to the aiming point 505, the distance D1 to the aiming point 505, information about the height of the topography of the aiming point 505, and a guide line GL and distance information DI from the aiming point 505 to a hole cup HC, which is the final target, may be displayed on the course map 501.

Here, the aiming point 505, which is the next target, may be a position calculated by the simulator, and may be based on the information transmitted to the mobile terminal through the server.

That is, when the user takes a golf shot, the simulator calculates an aiming point from the current position of the ball owned by the user in advance and displays the calculated aiming point in order to provide information about the guidance of the next golf shot to be taken by the user. The user may take a golf shot toward the aiming point calculated by the simulator as the next target. Alternatively, the user may change the next target to his/her desired position, which is different from the aiming point calculated by the simulator, and may then take a golf shot.

That is, the user who is playing may take a golf shot toward the aiming point calculated in advance and displayed through the simulator, as described above, or may designate a target that is different from the calculated aiming point using a manipulation device (a keyboard or a mouse) of the simulator and may take a golf shot toward the designated target.

The user who is waiting may confirm the aiming point 505, which is the next target calculated in advance by the simulator, from the current position p1 of the ball displayed on the course map in the mobile terminal and the distance from the position p1 of the ball to the aiming point 505 in order to determine whether the above information is suitable for performing his/her desired hole play method, and may plan the next golf shot in advance in the golf game progressed by the simulator.

The user who is waiting may change the information about the aiming point 505 displayed on the mobile terminal as described above by manipulating the mobile terminal in order to plan the next golf shot using his/her desired hole play method, a description of which will follow.

Meanwhile, as shown in FIG. 4, various information provision functions may be realized on the interface 500 of the mobile terminal MT. A shot history information provision unit 530 for providing information about the record of previous golf shots of the mobile terminal user on the hole in the golf game that is being played, a green information provision unit 521 for providing information about the green of the hole corresponding to the course map 501 that is currently displayed, a play tip information provision unit 522 for providing information about play tips for the hole, and a club information provision unit 523 for providing information about the golf club to be used for a golf shot from the current position p1 of the ball displayed on the current course map 501 to the aiming point 505 may be displayed.

The shot history information provision unit 530 may display information 532 about the record of previous golf shots of the user, such as average flight distance information, fairway landing rate information, and score information, at one side of the screen, as shown in FIG. 4. Information suitable for each kind of golf shot may be displayed as the record information 532.

For example, in the case of a tee shot, average flight distance information and fairway landing rate information may be displayed. In the case of an iron shot, information about the green landing rate and the par save rate may be displayed. In the case of an approach shot, information about the green landing rate and the near pin records may be displayed. In the case of putting, information about the average number of putts and the putting success rate may be displayed.

The shot history information, which is transmitted from the simulator to the server, may be received by the mobile terminal, which may display the shot history information.

The green information provision unit 521 may display a map of the green of a hole corresponding to the course map 501 displayed on the mobile terminal and information about the topography of the green.

The club information provision unit 523 may display all kinds of golf clubs ranging from a driver to a putter, and when the user selects one of the golf clubs, may display information about the selected golf club.

Meanwhile, the play tip information provision unit 522 may provide play tip information 522a, which is stored in the server or the simulator in advance so as to be provided by default, as play tip information for a hole corresponding to the course map 501 shown in FIG. 5. In addition, the play tip information provision unit 522 may provide information 522b about various play tips prepared by other users who have played the hole and stored in the server.

In addition, as shown in FIG. 5, a play tip preparation unit 522c, through which the user who is using the mobile terminal may directly prepare a play tip for the hole and may store the prepared play tip in the server, may be displayed.

Meanwhile, as shown in FIG. 4, the mobile terminal may directly display the information received from the server on the course map 501 such that the user can confirm the displayed information. In addition, the user may manipulate the interface 500 of the mobile terminal MT using a touch gesture, such as a touch or a drag, in order to change the currently displayed information based on his/her play method, and the mobile terminal may calculate information changed by the manipulation and display the calculated information, which will be shown in FIG. 6.

Referring to FIG. 6, the user manipulates (e.g. touches or drags) the aiming point 505, which is the next target, in order to locate the aiming point at the target when the user takes the next golf shot, and therefore the mobile terminal calculates the distance from the current ball position p1 to the manipulated aiming point 505 and displays the calculated distance. In addition, the mobile terminal displays distance and topography information 507 and height information of the point extracted from the topography information, and displays a guide line 506 from the current ball position p1 to the manipulated aiming point 505.

That is, in order to directly send the ball onto the green in the case in which the aiming point according to the information received from the server is located on the fairway, as shown in FIG. 4, the user having the ball located at the position p1 manipulates the aiming point 505 so as to be located on the green, as shown in FIG. 6, such that the mobile terminal calculates and displays information according to the manipulation.

In addition, the user may select a golf club suitable for reaching the manipulated aiming point 505 through the club information provision unit 523. FIG. 6 shows the case in which a number 3 wood is selected as the golf club used to reach the manipulated aiming point 505.

Meanwhile, according to the present invention, as described above, the user may manipulate the information displayed through the interface 500 of the mobile terminal MT according to his/her method for playing the next golf shot and may display the changed information on the mobile terminal. In addition, the user may set the manipulated and changed information and may transmit the set information to the server, which transmits the set information to the simulator such that environments based on the set information are automatically realized by the simulator when the user (the mobile terminal user) becomes the next player who takes a golf shot in the golf game that is being played.

A screen image in which the information based on the aiming point manipulated according to the play method for the next golf shot shown in FIG. 6 is set and transmitted to the simulator so as to be reflected in the golf game is shown in FIG. 7.

As shown in FIG. 7, on the mini map 112 in the screen image 110, an aiming point 112b, which is the next target, from the current ball position 112a, and relevant information 112c are changed according to the information set by the mobile terminal, as shown in FIG. 6. The main image 111 is also realized and displayed so as to face the aiming point 112b.

In addition, the information about the golf club set by the user through the mobile terminal may be reflected in the golf game of the simulator, whereby information 113 about the golf club to be used is displayed at one side of the screen.

As is apparent from the above description, the screen golf system and the golf information service method and the mobile terminal control method for golf information service realized in the screen golf system according to the present invention have advantages in that the information set by the user through his/her mobile terminal is automatically reflected by the simulator, in that the user who is waiting may plan a strategy for the next golf shot through his/her mobile terminal while he/she is waiting and may manipulate the mobile terminal such that the plan is displayed through the mobile terminal and may confirm the plan on the mobile terminal, and such that information is set and transmitted to the simulator, which automatically realizes the set information, whereby it is possible for the user to avoid manipulating the manipulation device of the simulator, which is troublesome, when the user takes the next golf shot, and therefore it is possible to improve user convenience and to more strategically play the golf game.

INDUSTRIAL APPLICABILITY

A screen golf system and a golf information service method and a mobile terminal control method for golf information service realized in the screen golf system according to the present invention are applicable to industries related to golf, in which a user may enjoy a round of virtual golf through golf simulation based on virtual reality.

The invention claimed is:

1. A golf information service method realized in a screen golf system in which users play a virtual golf game as the users hit a ball, the golf information service method comprising:
   accessing, by a mobile terminal of each of the users, a server connected to a simulator which is configured to realize a main image of a virtual golf course in which a virtual ball corresponding to the ball is simulated on a golf hole and a mini map showing a golf hole map, a current position of the virtual ball of each of the users on the golf hole map and an aiming point set as a next virtual ball landing area from each of the current position of the virtual ball, over a network;
   receiving, by the server, a virtual golf game information that is being performed by the simulator, wherein the virtual golf game information received from the simulator comprises the golf hole and the mini map showing the golf hole map, the current position of the virtual ball of each of the users on the golf hole map and the aiming point set as the next virtual ball landing area from each of the current position of the virtual ball on which the users are playing the virtual golf game;
   transmitting, by the server, the virtual golf game information to the mobile terminal of each of the users;
   displaying, by the mobile terminal, the golf hole map, the current position of the virtual ball of each of the users on the golf hole map and the aiming point set as the next virtual ball landing area from each of the current position of the virtual ball based on the virtual golf game information;
   changing and setting, by the mobile terminal, the aiming point to a new aiming point from the current position of the virtual ball on the golf hole map displayed on the mobile terminal;
   setting, by the mobile terminal, a golf club information to be used to take each user's next golf shot for the new aiming point; and
   transmitting the new aiming point and the golf club information set by the mobile terminal to the simulator via the server; and
   realizing, by the simulator, the new aiming point and the golf club information set by the mobile terminal,
   wherein upon one of the users who changed and set the new aiming point becoming a next player who takes a golf shot on the simulator, the simulator is configured to realize a golf club set by the mobile terminal and display the new aiming point from the current position of the virtual ball.

2. The golf information service method according to claim 1, wherein the step of receiving the virtual golf game information that is being performed by the simulator comprises, in a case in which a simulation image based on the golf shot taken by each of the users is progressed, the server receiving the virtual golf game information again from the simulator in order to update the virtual golf game information.

3. The golf information service method according to claim 1, wherein
   the step of receiving the virtual golf game information that is being performed by the simulator comprises the server receiving weather information on the hole, and green information on the hole from the simulator.

4. The golf information service method according to claim 1, wherein
   the simulator is configured to predetermine a situation occurring while the virtual golf game is being played, the step of receiving the virtual golf game information that is being performed by the simulator comprises, in a case in which the situation by the simulator occurs while the virtual golf game is being played, the server receiving the situation and the virtual golf game information to be provided to each of the users, and
   the step of transmitting the virtual golf game information to the mobile terminal comprises the server transmitting the virtual golf game information received from the simulator and the virtual golf game information to be provided to each of the users based thereon to the mobile terminal.

5. The golf information service method according to claim 1, wherein
   the step of transmitting the virtual golf game information, received from the simulator, to the mobile terminal comprises the server transmitting the golf game progress information that is being played by each of the users of the mobile terminal to the mobile terminal.

6. The golf information service method according to claim 1, the mobile terminal is configured to calculate information about the next ball landing area from the current position of the ball owned by each of the users on the golf hole map displayed on the mobile terminal, which is changeable by manipulation of each of the users, based on a calculated information received from the server and displaying the calculated information.

7. The golf information service method according to claim 1, wherein
   the golf game progress information is set by the simulator according to predetermined particulars, wherein the mobile terminal of each of the users receives the golf game progress information of each of the users.

8. A mobile terminal control method for golf information service realized in a screen golf system, the mobile terminal control method comprising:
   accessing a server connected to a simulator, configured to realize a virtual golf course and a mini map showing a golf hole map, a current position of a virtual ball of each of users on the golf hole map and an aiming point set as a next virtual ball landing area from each of the current position of the virtual ball such that each of the users plays a virtual golf game, over a network;
   receiving, from the server, a virtual golf game information that is being performed by the simulator, comprising the golf hole map, the current position of the virtual ball of each of users on the golf hole map and the aiming point set as the next virtual ball landing area from each of the current position of the virtual ball on which the users are playing the game;
   displaying the golf hole map, the current position of the virtual ball of each of users on the golf hole map and the aiming point set as the next virtual ball landing area from each of the current position of the virtual ball;
   changing and setting the aiming point to a new aiming point from the current position of the virtual ball on the golf hole map displayed on the mobile terminal;
   setting a golf club information to be used to take each user's next golf shot for the new aiming point; and
   transmitting the new aiming point and the golf club information to the simulator via the server; and
   realizing, by the simulator, the new aiming point and the golf club information,
   wherein upon one of the users who changed and set the new aiming point becoming a next player who takes a golf shot on the simulator, the simulator is configured to realize a golf club and display the new aiming point from the current position of the virtual ball.

9. The mobile terminal control method according to claim 8, the next ball landing area from the current position of the ball owned by each of the users on the golf hole map displayed on the mobile terminal is changeable by manipulation of each of the users based on a calculated information received from the server and displaying the calculated information.

10. The mobile terminal control method according to claim 8, wherein the virtual golf game progress information is set by the simulator according to predetermined particulars, wherein the mobile terminal of each of the users receives the virtual golf game progress information of each of the users.

11. The mobile terminal control method according to claim 8, wherein the simulator displays an image based on the virtual golf game progress information.

12. A screen golf system for realizing a golf information service method according to claim 1.

* * * * *